US011739793B2

(12) United States Patent
Bolton

(10) Patent No.: US 11,739,793 B2
(45) Date of Patent: Aug. 29, 2023

(54) SELF-GOVERNING BEARING ASSEMBLY

(71) Applicant: Consolidated Nuclear Security, LLC, Oak Ridge, TN (US)

(72) Inventor: Justin T. Bolton, Clinton, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 486 days.

(21) Appl. No.: 16/942,834

(22) Filed: Jul. 30, 2020

(65) Prior Publication Data

US 2022/0034362 A1  Feb. 3, 2022

(51) Int. Cl.
| | |
|---|---|
| *F16C 19/06* | (2006.01) |
| *F16C 19/26* | (2006.01) |
| *F16C 19/36* | (2006.01) |
| *F16C 32/04* | (2006.01) |
| *F16C 41/00* | (2006.01) |
| *F16C 25/08* | (2006.01) |
| *F16D 51/10* | (2006.01) |

(52) U.S. Cl.
CPC ............ *F16C 25/083* (2013.01); *F16C 19/06* (2013.01); *F16C 41/001* (2013.01); *F16D 51/10* (2013.01); *F16C 19/364* (2013.01); *F16C 32/04* (2013.01)

(58) Field of Classification Search
CPC ........ F16C 19/06; F16C 19/26; F16C 19/364; F16C 25/083; F16C 32/04; F16C 32/0474; F16C 32/0478; F16C 32/048; F16C 32/0482; F16C 41/001; F16D 51/10; F16D 51/12
See application file for complete search history.

(56) References Cited

U.S. PATENT DOCUMENTS

| | | | | |
|---|---|---|---|---|
| 8,376,095 | B2 * | 2/2013 | Nuissl | F16C 33/60 |
| | | | | 188/171 |
| 8,376,096 | B2 * | 2/2013 | Nuissl | F16C 33/60 |
| | | | | 188/161 |
| 8,981,764 | B2 | 3/2015 | Schaefer et al. | |

(Continued)

FOREIGN PATENT DOCUMENTS

| | | | | |
|---|---|---|---|---|
| CN | 111585385 B | * | 7/2021 | ........... F04D 19/002 |
| DE | 102007018158 A1 | * | 10/2008 | .............. F16C 19/38 |
| DE | 102011003299 A1 | * | 8/2012 | .............. F16C 19/38 |

OTHER PUBLICATIONS

U.S. Pat. No. 822,723 that would not allow for these specific numbers in the patent column Jun. 5, 1906, Conrad.

*Primary Examiner* — Phillip A Johnson
(74) *Attorney, Agent, or Firm* — Clements Bernard Walker; Christopher L. Bernard

(57) ABSTRACT

A self-governing bearing assembly is disclosed. The self-governing bearing assembly includes a stator and a rotor. The stator includes a brake contacting surface. The stator is one of an outer ring and an inner ring. The rotor includes the other of the outer ring and the inner ring, brake pads, and a circular spring. The brake pads are positioned radially from the brake contacting surface and adapted to rotate with the other of the outer ring and the inner ring. Each of the brake pads includes a pad retention slot. The circular spring is positioned within the pad retention slot of each of the brake pads. The bearing elements are axially aligned with a first bearing portion of the stator and a second bearing portion of the rotor. The bearing elements are adapted to rotationally support the rotor relative to the stator.

20 Claims, 8 Drawing Sheets

(56) References Cited

U.S. PATENT DOCUMENTS

| | | |
|---|---|---|
| 9,551,386 B2 | 1/2017 | Polito et al. |
| 10,030,707 B2 | 7/2018 | Taniguchi |
| 2005/0282673 A1* | 12/2005 | Knappe .................. F16M 11/06 474/198 |
| 2008/0260318 A1 | 10/2008 | Schuh et al. |

* cited by examiner

SELF-GOVERNING BEARING ASSEMBLY

STATEMENT REGARDING GOVERNMENT RIGHTS

The U.S. Government has certain rights to the present disclosure pursuant to Contract No. DE-NA0001942 between the U.S. Department of Energy and Consolidated Nuclear Security, LLC.

TECHNICAL FIELD

The present disclosure generally relates to self-governing bearings. More particularly, the present disclosure relates to systems and methods for limiting rotational shaft speeds with self-governing bearings.

BACKGROUND

Many mechanisms involving motion have bearings. Bearings reduce friction, prolong the life of mechanisms and machines, and support radial and axial loads. Traditionally, bearings are given a revolutions per minute (RPM) rating for how fast the rotor of the bearing can spin before failure. In such a failure condition, significant damage can occur to the machines and nearby equipment, and injury to people can also occur.

Furthermore, bearings that permit excessive speeds during use can also become dangerous, particularly as the rotor builds and gains momentum. Excessive rotor speeds can also result in injury to people and damage to equipment.

The above-described background relating to bearings is merely intended to provide a contextual overview of some current issues and is not intended to be exhaustive. Other contextual information may become apparent to those of ordinary skill in the art upon review of the following description of exemplary embodiments.

SUMMARY

The present disclosure generally provides self-governing bearings that have a built in safety feature that reduces undesirable rotational speeds of a rotor. In particular, the self-governing bearing assembly includes brake pads held in position by a circular spring, such as a garter spring. When a specific speed is reached, the centrifugal force and the spring force do not reach equilibrium before the brake pads contact a static braking surface. This contact between the brake pads and the static braking surface slow down the rotating components of the self-governing bearing assembly and the rotor down. Further, the speed at which the brake pads come into contact with the static braking surface can be controlled based on the properties of the circular spring selected to hold the brake pads out of contact with the static braking surface.

With the self-governing braking caused by the brake pads, failure conditions of bearings can be prevented, and machines can be prevented from operating at dangerous speeds without the need for separate speed limiters therein.

In one exemplary embodiment, the present disclosure provides a self-governing bearing assembly. The self-governing bearing assembly includes a stator, a rotor, and bearing elements. The stator includes a first bearing portion and a braking portion axially offset from the first bearing portion and including a brake contacting surface. The stator is one of an outer ring and an inner ring where the inner ring is positioned at least partially within the outer ring. The rotor includes the other of the outer ring and the inner ring, brake pads, and a circular spring. The other of the outer ring and the inner ring includes a second bearing portion. The brake pads are positioned radially from the brake contacting surface and are adapted to rotate with the other of the outer ring and the inner ring. Each of the brake pads includes a pad retention slot. The circular spring is positioned within the pad retention slot of each of the brake pads. The bearing elements are axially aligned with the first bearing portion and the second bearing portion and are adapted to rotationally support the rotor relative to the stator.

In embodiments, the circular spring is adapted to hold the brake pads in an annular offset position from the brake contacting surface while the rotor rotates below a predetermined speed and to allow the brake pads to contact the brake contacting surface while the rotor rotates at or above the predetermined speed. Optionally, the circular spring is selectable from a plurality of circular springs, and the predetermined speed is determined based on one or more properties of the selected circular spring or springs. Optionally, the plurality of circular springs is color coded based on the one or more properties of each of the plurality of circular springs.

In some embodiments, the circular spring is a garter spring. In some embodiments, the bearing elements include one of rolling elements, electro-magnets, and fluid for supporting the inner rotor relative to the outer ring. And in some embodiments, the first bearing portion includes a first race, the second bearing portion includes a second race, and the bearing elements include one of balls, rollers, and tapered rollers positioned radially between and within the first race and the second race.

In another exemplary embodiment, the present disclosure provides a self-governing bearing assembly. The self-governing bearing assembly includes an outer ring, an inner rotor, and bearing elements. The outer ring includes a brake contacting surface that is an internally facing circumferential surface of the outer ring. The inner rotor includes retainers, brake pads, and a circular spring. The retainers are circumferentially spaced apart and each include a housing retention slot. The brake pads are positioned radially inward from the brake contacting surface. Each of the brake pads is positioned circumferentially between adjacent retainers and includes a pad retention slot. The circular spring is positioned within an annular slot formed by the housing retention slot and the pad retention slot of each of the retainers and the brake pads. The bearing elements are adapted to rotationally support the inner rotor relative to the outer ring.

In embodiments, the circular spring is adapted to hold the brake pads in an annular offset position from the brake contacting surface while the inner rotor rotates below a predetermined speed and to allow the brake pads to contact the brake contacting surface while the inner rotor rotates at or above the predetermined speed. Optionally, the circular spring is selectable from a plurality of circular springs, and the predetermined speed is determined based on one or more properties of the selected circular spring. Optionally, the plurality of circular springs is color coded based on the one or more properties of each of the plurality of circular springs.

In some embodiments, the circular spring is a garter spring.

In some embodiments, the bearing elements include one of rolling elements, electro-magnets, and fluid for supporting the inner rotor relative to the outer ring. In some embodiments, the outer ring includes an outer race axially spaced from the brake contacting surface, the inner rotor includes an inner race axially spaced from the retainers, and the bearing elements include one of balls, rollers, and tapered rollers positioned radially between and within the outer race and the inner race.

In some embodiments, each of the retainers and the brake pads includes an annular sector shape that combine to form an annular shape.

In a further exemplary embodiment, the present disclosure provides a self-governing bearing assembly. The self-governing bearing assembly includes an inner ring, an outer rotor, and bearing elements. The inner ring includes a brake contacting surface that is an externally facing circumferential surface of the inner ring. The outer rotor includes an outer ring, brake pads, and a circular spring. The outer ring includes an outer brake housing portion. The brake pads are positioned radially outward from the brake contacting surface and within the brake housing portion. Each of the brake pads includes a pad retention slot. The circular spring is positioned within the pad retention slot of each of the brake pads. The bearing elements adapted to rotationally support the inner rotor relative to the outer ring.

In embodiments, the circular spring is adapted to hold the brake pads in an annular offset position from the brake contacting surface while the outer rotor rotates below a predetermined speed and to allow the brake pads to contact the brake contacting surface while the outer rotor rotates at or above the predetermined speed. Optionally, each brake pad includes a brake body and a brake ring adjoining the brake body. The brake ring includes a bore with the inner ring received therein and a brake surface within the bore opposite the brake body. A mass of the brake body relative to the brake ring is such that a center of mass of the brake pad is toward the brake body relative to a center of rotation of the outer rotor, such that the brake pad shifts radially outward and the brake surface shifts radially inward and into contact with the brake contacting surface while the outer rotor rotates at or above the predetermined speed. Optionally, the circular spring is selectable from a plurality of circular springs, and the predetermined speed is determined based on one or more properties of the selected circular spring or springs. Optionally, the plurality of circular springs is color coded based on the one or more properties of each of the plurality of circular springs.

In some embodiments, the bearing elements include one of rolling elements, electro-magnets, and fluid for supporting the inner rotor relative to the outer ring.

In yet a further exemplary embodiment, the present disclosure provides a self-governing bearing assembly. The self-governing bearing assembly includes an outer race portion, an outer brake housing portion, an inner ring, a brake housing, a plurality of brake pads, a circular spring, and bearing elements. The outer race portion includes an outer race. The outer brake housing portion includes a brake contacting surface axially offset from the outer race. The inner ring includes an inner bearing portion and an inner hub. The inner bearing portion includes an inner race positioned radially inward from the outer race. The inner hub extends axially from the inner bearing portion. The inner hub includes a radially outward facing hub surface. The brake housing is mounted on the inner hub at the hub surface and is adapted to rotate with the inner ring. The brake housing includes an annular body and a plurality of retainers extending axially from the annular body. Each of the plurality of retainers includes a housing retention slot formed therein. The plurality of brake pads is positioned radially inward from the brake contacting surface. Each of the plurality of brake pads is positioned circumferentially between adjacent retainers and includes a pad retention slot formed therein. The housing retention slot and the pad retention slot of each of the plurality of retainers and the plurality of brake pads combine to form an annular slot. The circular spring is positioned within the annular slot. The bearing elements are positioned radially between and within the outer race and the inner race.

In embodiments, the circular spring is adapted to retain the plurality of brake pads via the annular slot such that the plurality of brake pads are radially spaced apart from the brake contacting surface while spinning at a revolutions per minute (RPM) below a predetermined RPM and that the plurality of brake pads are in frictional contact with the brake contacting surface while spinning at an RPM at or above the predetermined RPM.

In some embodiments, the circular spring is a garter spring. In some embodiments, the circular spring is selectable from a plurality of circular springs, and the predetermined RPM is determined based on one or more properties of the selected circular spring or springs. Optionally, the plurality of circular springs is color coded based on the one or more properties of each of the plurality of circular springs.

In some embodiments, the bearing elements include one of balls, rollers, and tapered rollers.

In some embodiments, each of the plurality of retainers and the plurality of brake pads includes an annular sector shape that combine to form an annular shape.

In some embodiments, the outer race portion and the outer brake housing portion are integrally formed as a unitary component.

In some embodiments, the brake housing is mounted to the brake hub with at least one of an interference fit and a keyed configuration.

In still a further exemplary embodiment, the present disclosure provides a method governing a speed of a rotor. The method includes providing a self-governing bearing assembly which includes a stator, a rotor, and bearing elements. The stator includes a first bearing portion and a braking portion axially offset from the first bearing portion and including a brake contacting surface. The stator is one of an outer ring and an inner ring where the inner ring is positioned at least partially within the outer ring. The rotor includes the other of the outer ring and the inner ring, brake pads, and a circular spring. The other of the outer ring and the inner ring includes a second bearing portion. The brake pads are positioned radially from the brake contacting surface and are adapted to rotate with the other of the outer ring and the inner ring. Each of the brake pads includes a pad retention slot. The circular spring is positioned within the pad retention slot of each of the brake pads. The bearing elements are axially aligned with the first bearing portion and the second bearing portion and are adapted to rotationally support the rotor relative to the stator. The method also includes selecting a circular spring based on a predetermined maximum speed for the rotor. The method further includes positioning the circular spring within an annular slot formed by the housing retention slot and the pad retention slot of each of the retainers and the brake pads.

In some embodiments, the circular spring is selectable from a plurality of circular springs, and the predetermined maximum speed of the rotor is determined based on one or more properties of the selected circular spring or springs. Optionally, the plurality of circular springs is color coded based on the one or more properties of each of the plurality of circular springs.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

In various embodiments, the present disclosure relates to systems and methods for governing rotors with self-governing bearings. Again, the self-governing bearings have a built-in safety feature that reduces undesirable rotational speeds of a rotor using brake pads within an inner rotor of the bearing assembly. The brake pads are held in a position offset from a static braking surface on an outer ring by a circular spring while the inner rotor operates below a selected RPM. When the inner rotor reaches speeds at or above the selected RPM, the centrifugal force is increased, and the centrifugal force and the spring force do not reach equilibrium before the brake pads move radially into contact with the static braking surface. The friction between the brake pads and the static braking surface slow the rotation of the inner rotor of the bearing assembly, which slows the rotor down.

This self-governing configuration of the bearing assembly helps reduce unwanted and undesirable rotational speeds of the rotor, prevents the bearing assembly from exceeding its maximum rating, and can help prevent machinery, consumer products, and the like from operating at unsafe rotational speeds.

Furthermore, the governing speed of the bearing assembly can be controlled based on the properties of the spring. For example, a spring with a higher spring constant will not allow the brake pads to contact the brake contacting surface until a higher rotational speed compared to that of a spring with a lower spring constant.

Figure 1:
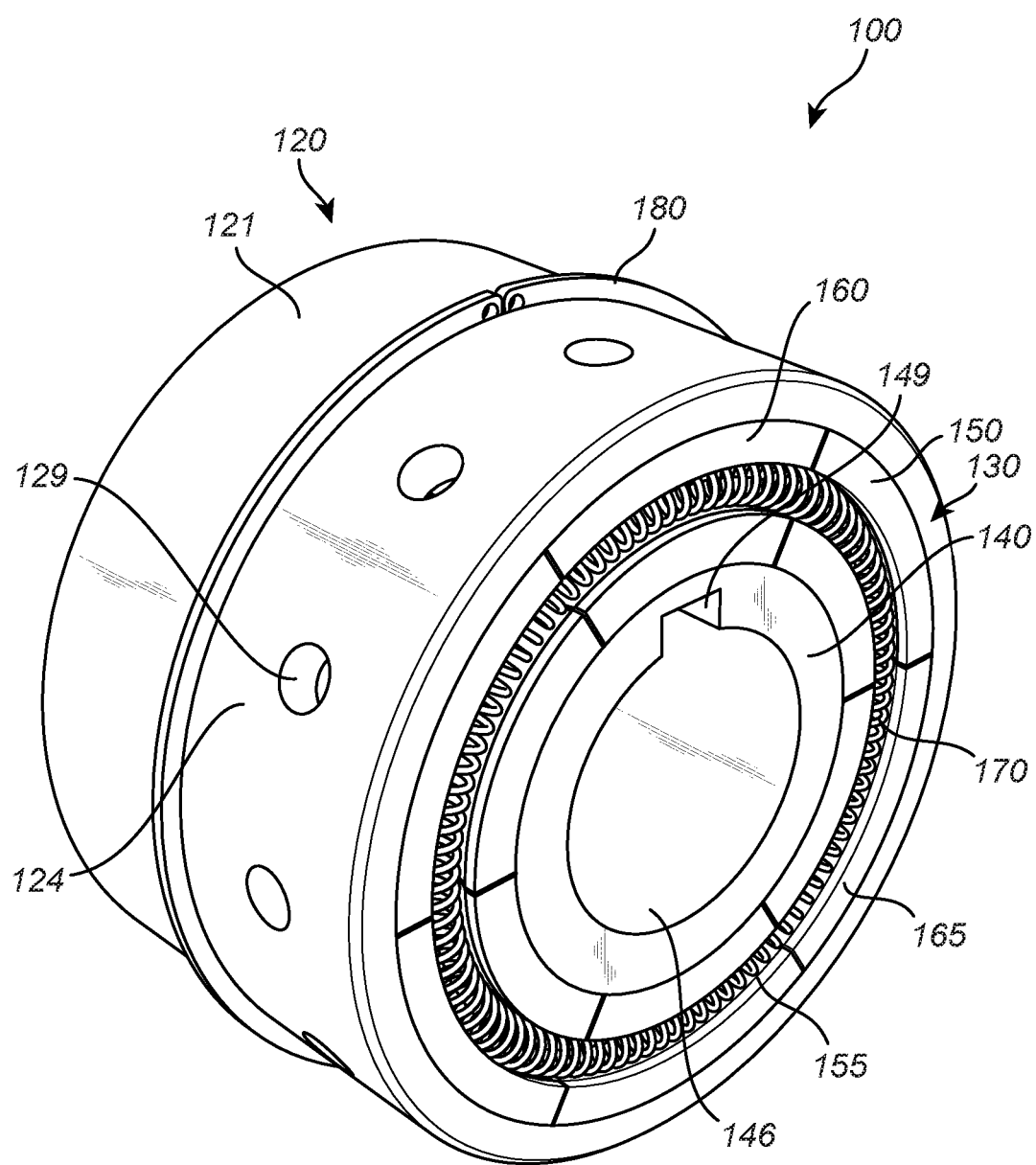
FIG. 1 is a perspective view of an exemplary embodiment of a self-governing bearing.
Figure 2:
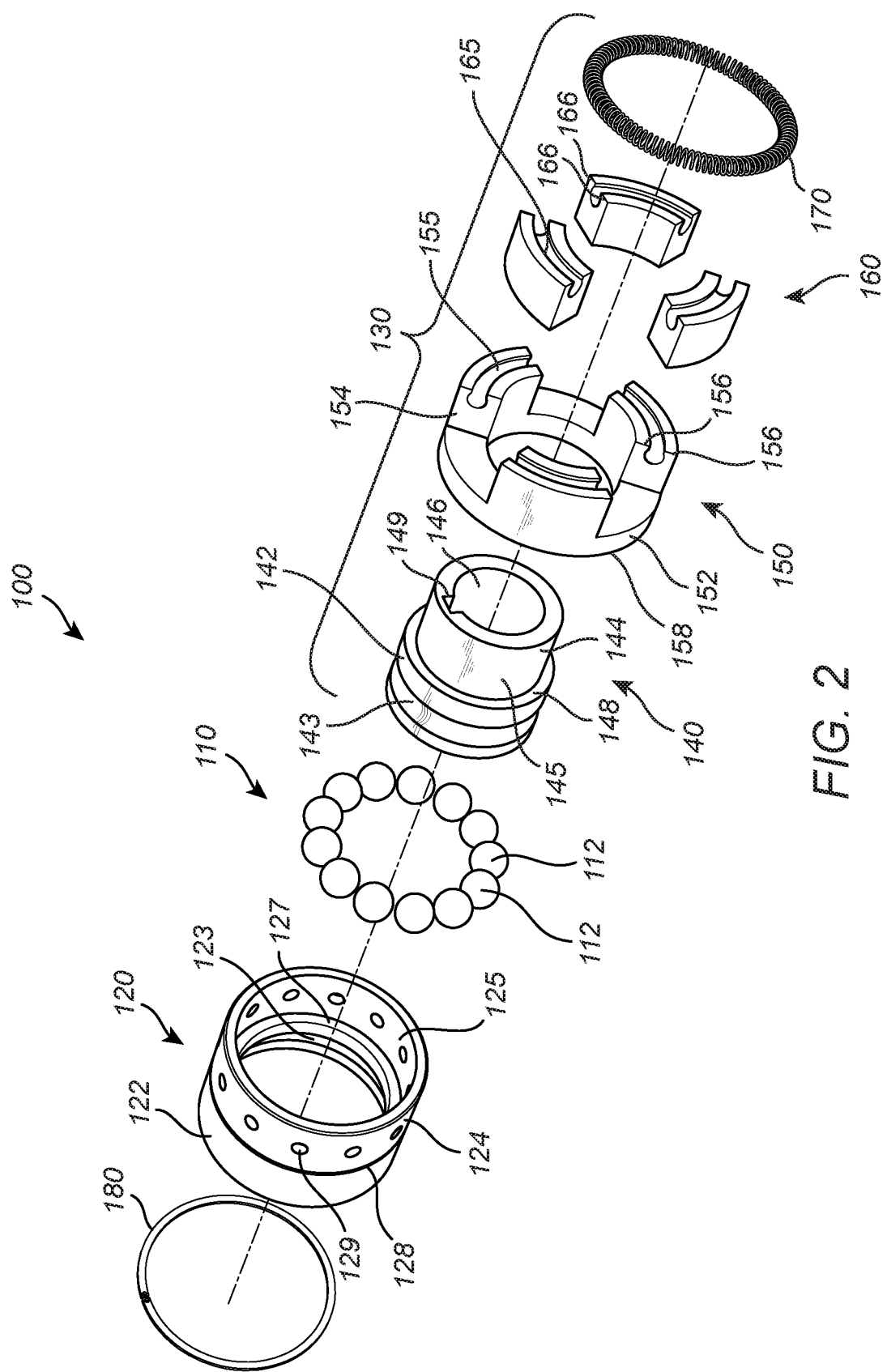
FIG. 2 is an exploded perspective view of the self-governing bearing of FIG. 1.
Figure 3:
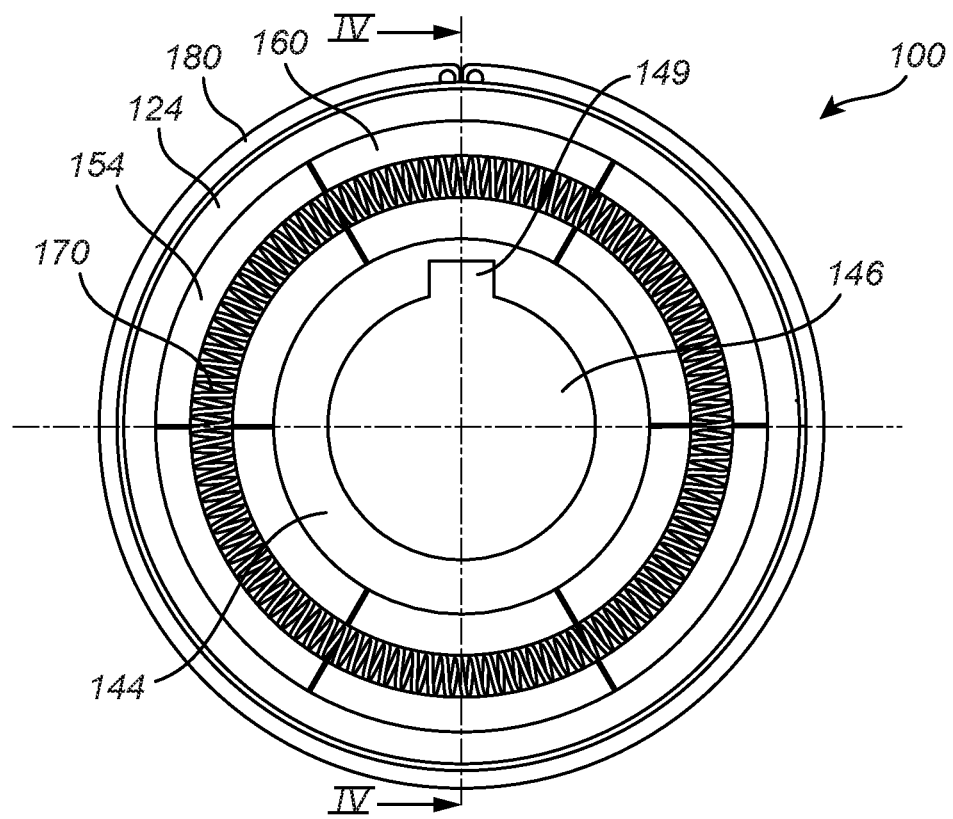
FIG. 3 is a front perspective view of the self-governing bearing of FIG. 1.
Figure 4:
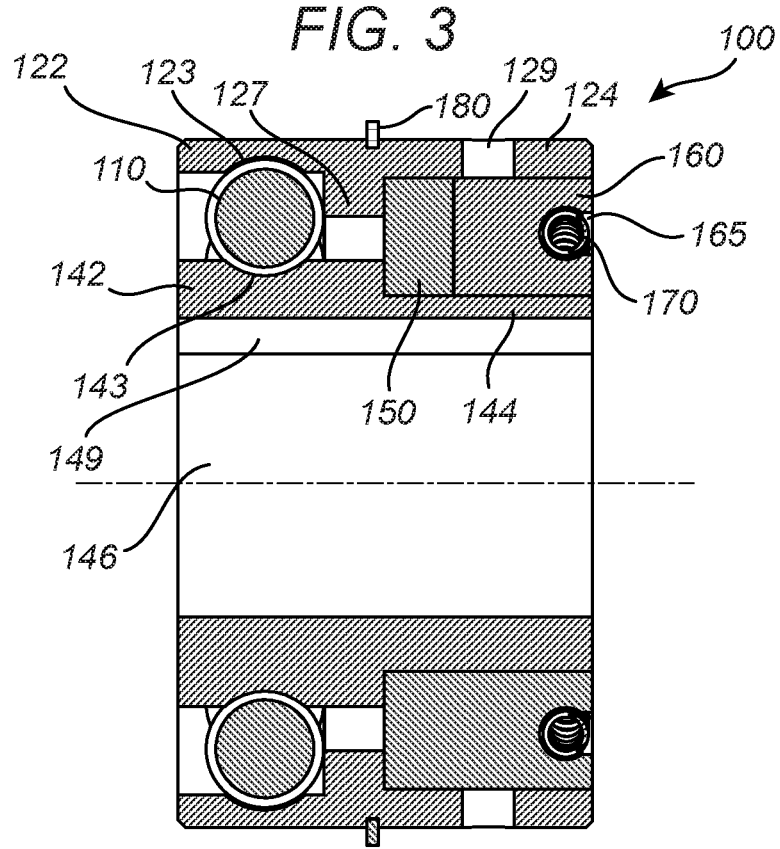
FIG. 4 is a cross-sectional view of the self-governing bearing of FIG. 1 taken along the line IV-IV of FIG. 3.

FIG. 1 is a perspective view of an exemplary embodiment of a self-governing bearing 100. FIG. 2 is an exploded perspective view of the self-governing bearing 100 of FIG. 1. FIG. 3 is a front perspective view of the self-governing bearing 100 of FIG. 1. FIG. 4 is a cross-sectional view of the self-governing bearing 100 of FIG. 1 taken along the line IV-IV of FIG. 3. Referring to FIGS. 1-4, the self-governing bearing assembly 100 includes an outer ring 120, an inner rotor 130, and bearings 110. In the embodiment illustrated, the outer ring 120 is a stator and is adapted to remain stationary. In the embodiment illustrated, the outer ring 120 includes an outer race portion 122 and an outer brake housing portion 124. The outer race portion 122 includes an outer race 123. The outer race 123 is positioned on an internally facing surface of the outer race portion 122 and is adapted to receive the bearings 110 therein.

The outer brake housing portion 124 includes a brake contacting surface 125 axially offset from the outer race 123. The brake contacting surface 125 is an internally facing circumferential surface of the outer brake housing portion 124 and of the outer ring 120. In the embodiment illustrated in FIGS. 1-4, the outer race portion 122 and the outer brake housing portion 124 are integrally formed as a unitary component forming the outer ring 120. In other embodiments, the outer race portion 122 and the outer brake housing portion 124 are joined together to form the outer ring 120, such as in instances where the surface property requirements for the brake contacting surface 125 and for the outer race 123 are different. In some embodiments, the brake contacting surface 125 includes a coating to protect against frictional wear at the brake contacting surface 125 during contact thereto for braking.

In some embodiments, the outer ring also includes an external annular slot 128, radial holes 129, and an internal annular protrusion 127. The external annular slot 128 is an annular groove around the exterior surface of the outer ring 120 and is adapted to receive a retaining ring 180. The retaining ring 180 is adapted to help restrain the positioning of the self-governing bearing assembly 100 within a larger assembly. The radial holes 129 are circumferentially positioned about the outer ring 120, such as about the outer brake housing portion 124. The radial holes 129 extend radially through the outer ring 120. The internal annular protrusion 127 is positioned axially between the outer race 123 and the brake contacting surface 125. The internal annular protrusion 127 extends radially inward from a body of the outer ring 120, can act to stiffen the outer ring 120, and can act to seal the outer race 123, at least partially, from the brake contacting surface 125. Further sealing adjacent to or in place of the internal annular protrusion 127 is also included in some embodiments. In embodiments, preventing lubrication from reaching the brake contacting surface 125 ensures that the speed limiting of the self-governing bearing assembly 100 properly occurs. Other seals, such as a seal on the opposing side of the outer race 123, are also contemplated.

In the embodiment illustrated, the inner rotor 130 includes an inner ring 140, a brake housing 150, brake pads 160, a circular spring 170, and bearings 110. The inner ring 140 includes an inner bearing portion 142 and an inner hub 144. The inner bearing portion 142 includes an inner race 143 positioned radially inward from the outer race 123. The inner hub 144 extends axially from the inner bearing portion 142. The inner hub 144 includes a radially outward facing hub surface 145. In the embodiment illustrated, the inner hub 144 has a diameter that is smaller than that of the inner bearing portion 142 such that an inner abutment surface 148 is formed as an annular surface at the interface thereof.

The inner ring 140 also includes a shaft bore 146 adapted to receive a rotor, such as a shaft. In some embodiments, the inner ring 140 also includes a key 149 for maintaining a rotation of the inner ring 140 with that of the rotor. However, in other embodiments, other strategies are used to maintain the relative motion of the inner ring 140 and the rotor, such as an interference fit, and the like.

The brake housing 150 is mounted on the inner hub 144 at the hub surface 145 and is adapted to rotate with the inner ring 140. Similar to the interface between the rotor and the inner ring 140, multiple strategies for maintaining the relative motion between the brake housing 150 and the inner ring 140 are contemplated. In the embodiment illustrated, the brake housing 150 is mounted on the inner hub 144 with an interference fit. In other embodiments, a key is used, such as an annular slot in one of the brake housing 150 and the inner hub 140, and an annular protrusion in the other of the brake housing 150 and the inner hub 140. Other keyed interfaces, such as the use of right-prism shapes at the interfaces, including pentagonal prisms, hexagonal prisms, octagonal prisms, and the like are also contemplated.

The brake housing 150 includes an annular body 152 and retainers 154 extending axially from the annular body 152. The annular body 152 includes a housing abutment surface 158. The housing abutment surface 158 is an annular surface on the axial end of the annular body 152 opposite the retainers 154. In the embodiment illustrated, the housing abutment surface 158 abuts the inner ring abutment surface 148 to axially align the brake housing 150 with the inner ring 140.

In the embodiment illustrated, each of the retainers 154 includes an annular sector shape with annular sector shaped spaces therebetween for receiving the brake pads 160. Each of the retainers 154 includes a housing retention slot 155 formed therein. In the embodiment illustrated, the housing retention slot 155 is a sector of an annular slot and is positioned at an axial end of the corresponding retainer 154 distal to the annular body 152. However, in other embodiments, the housing retention slots 155 are at different positions, such as at the radially outer surfaces of the retainers 154, and the like. In some embodiments, each of the retainers 154 includes housing shoulders 156 that partially extend over the housing retention slots 155 to help retain the circular spring 170 therein. The outer radial surfaces of the brake housing 150 are sized such that there is a radial gap between the brake housing 150 and the brake contacting surface 125.

The brake pads 160 are positioned radially inward from the brake contacting surface 125. Each of the brake pads 160 is positioned circumferentially between adjacent retainers 154 and includes a pad retention slot 165 formed therein. The radial length of the brake pads 160 and the retainers 154 are adapted to radially overlap, such that at least a portion of the brake pads 160 always overlap with the retainers 154. In the embodiment illustrated, each of the retainers 154 includes an annular sector shape that is adapted to fit within the annular sector shaped spaces between the retainers 154, such that each of the brake pads 160 is circumferentially positioned between adjacent retainers 154.

In the embodiment illustrated, the pad retention slots 165 also include a sector of an annular slot. The pad retention slots 165 are adapted to align with the housing retention slots 155. The housing retention slot 155 and the pad retention slot 165 of each of the retainers 154 and the brake pads 160 combine to form the annular slot. The pad retention slots 165 are positioned at an axial end of the brake pads 160 and are adapted to be positioned distal to the annular body 152. However, in other embodiments, the pad retention slots 165 are at different positions, such as at the radially outer surfaces of the brake pads 160, and the like. In some embodiments, each of the brake pads 160 includes pad shoulders 166 that partially extend over the pad retention slots 165 to help retain the circular spring 170 therein.

In embodiments, the brake pads 160 are formed of a ceramic material. However, other materials that will wear down, while limiting the wear on the brake contacting surface 125 are also contemplated.

The circular spring 170 is positioned within the annular slot formed by the housing retention slots 155 and the pad retention slots 165. In some embodiments, the circular spring 170 is a garter spring. However, other annular springs are also contemplated. The circular spring 170 is adapted to hold the brake pads 160 in an annular offset position from the brake contacting surface 125 while the inner rotor 130 rotates below a predetermined speed and to allow the brake pads 160 to contact the brake contacting surface 125 while the inner rotor 130 rotates at or above the predetermined speed. Thus, the circular spring 170 is adapted to retain the brake pads 160 via the annular slot such that the brake pads 160 are radially spaced apart from the brake contacting surface 125 while spinning at RPMs below a predetermined RPM and that brake pads 160 are in frictional contact with the brake contacting surface 125 while spinning at RPMs at or above the predetermined RPM.

In some embodiments, the circular spring 170 is selectable from multiple circular springs 170. The predetermined speed is determined and controlled based on one or more properties of the selected circular spring 170. In some of these embodiments, the circular springs 170 are color coded based on the one or more properties of each of the circular springs 170. For example, circular springs with different spring constants will have different stiffnesses and will allow the brake pads 160 to contact and have friction with the brake contacting surface 125 at different speeds, which allows the self-governing bearing assembly 100 to be adapted for various speed limiting scenarios by simply switching the circular spring 170.

The bearings 110 include bearing elements 112 that are positioned radially between and within the outer race 123 and the inner race 143. In embodiments, the bearing elements 112 include one of balls (such as the embodiment illustrated), rollers, and tapered rollers. The use of other bearings, such as deep-groove bearings, pillow block bearings, thrust bearings, and the like are also contemplated.

While the embodiment illustrated in FIGS. 1-4 is that of a rolling element bearing, in some embodiments, other types of bearings are also used, such as magnetic bearings, fluid bearings, and the like. In these embodiments, the outer race and inner race are not necessary. Furthermore, the bearing elements include electro-magnets or fluid for supporting the inner rotor 130 relative to the outer ring 120.

Figure 5:
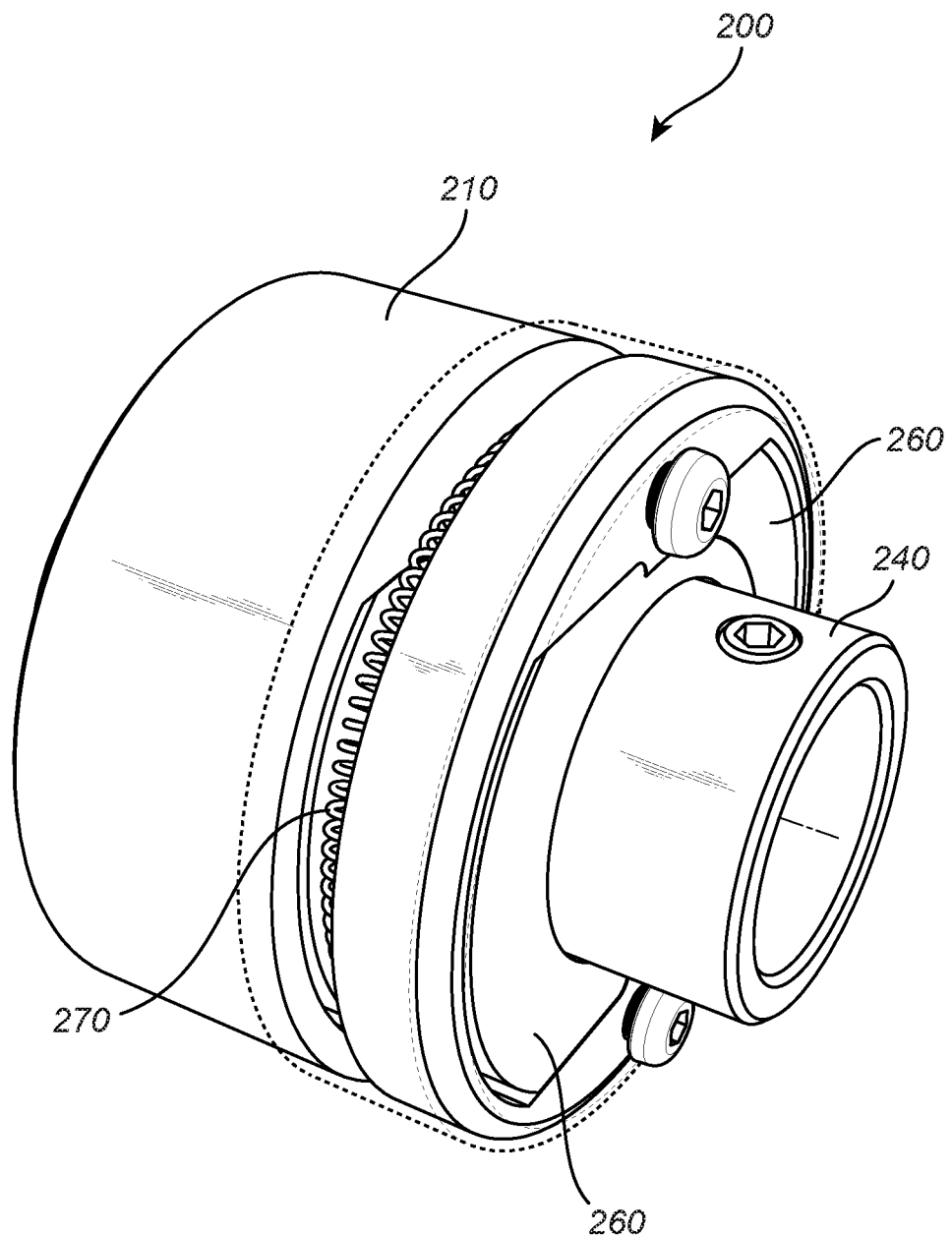
FIG. 5 is a perspective view of an exemplary embodiment of a self-governing bearing.
Figure 6:
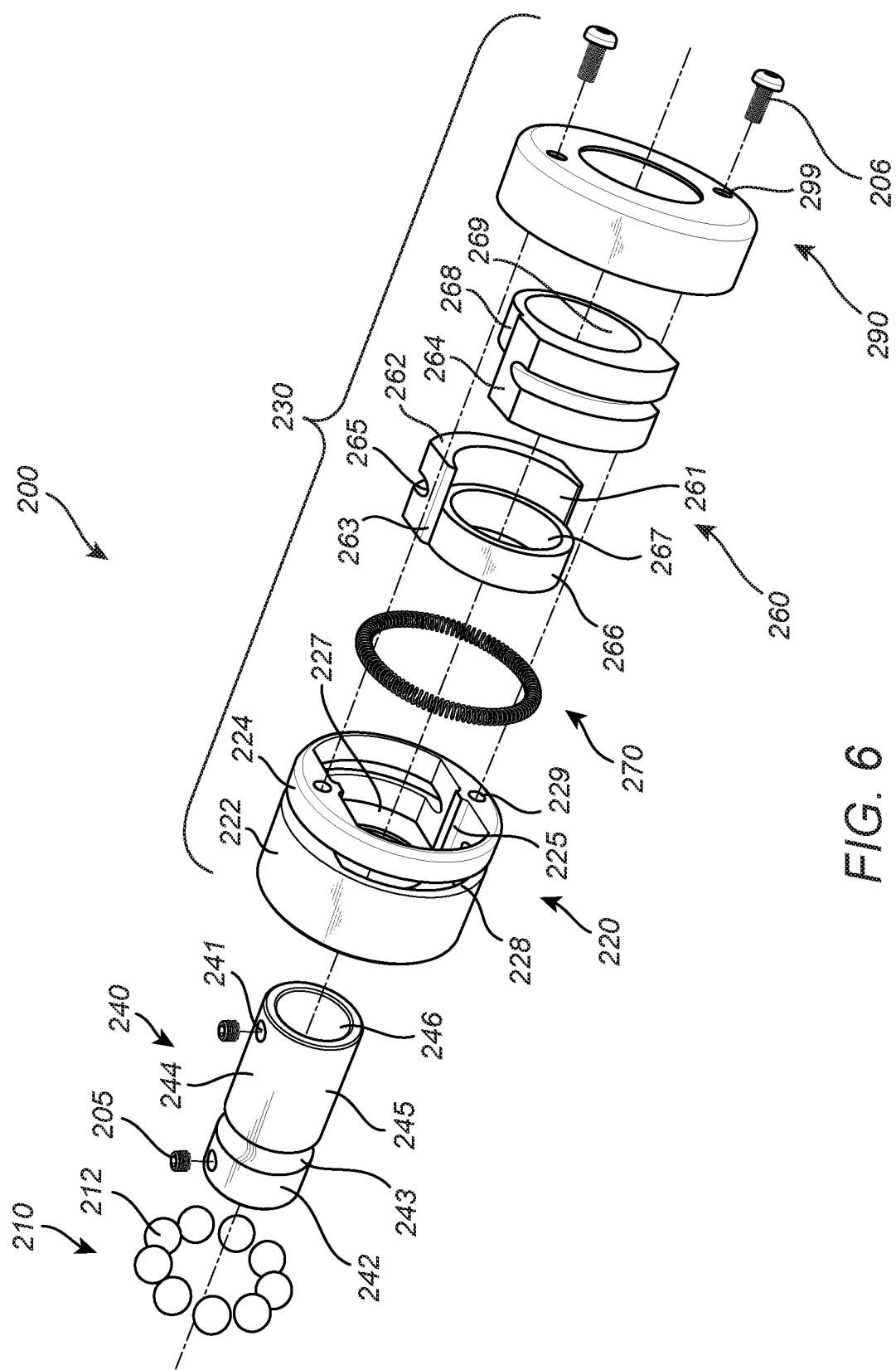
FIG. 6 is an exploded perspective view of the self-governing bearing of FIG. 5.
Figure 7:
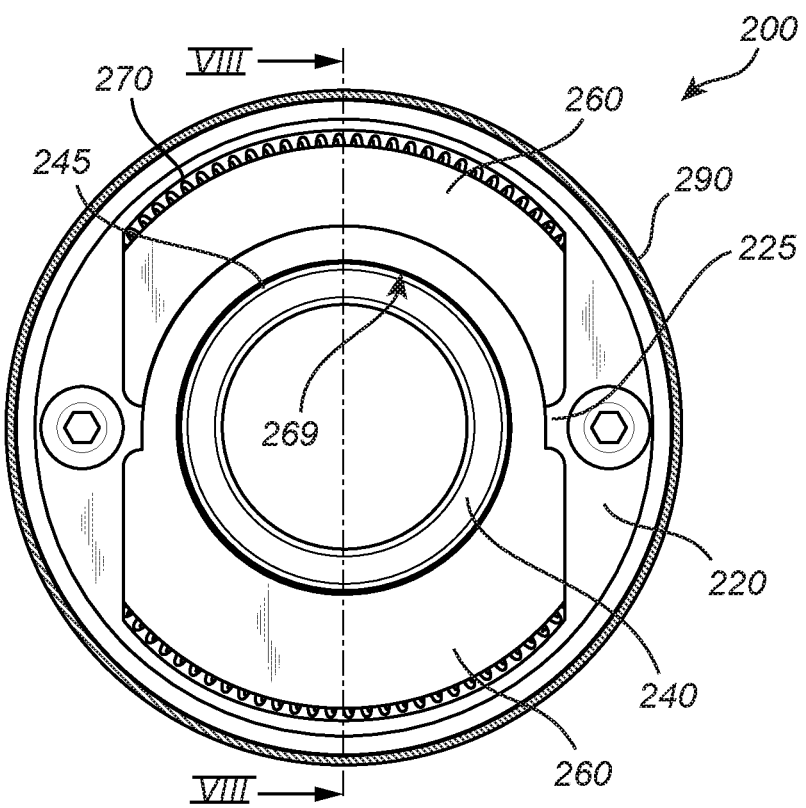
FIG. 7 is a front perspective view of the self-governing bearing of FIG. 5.
Figure 8:
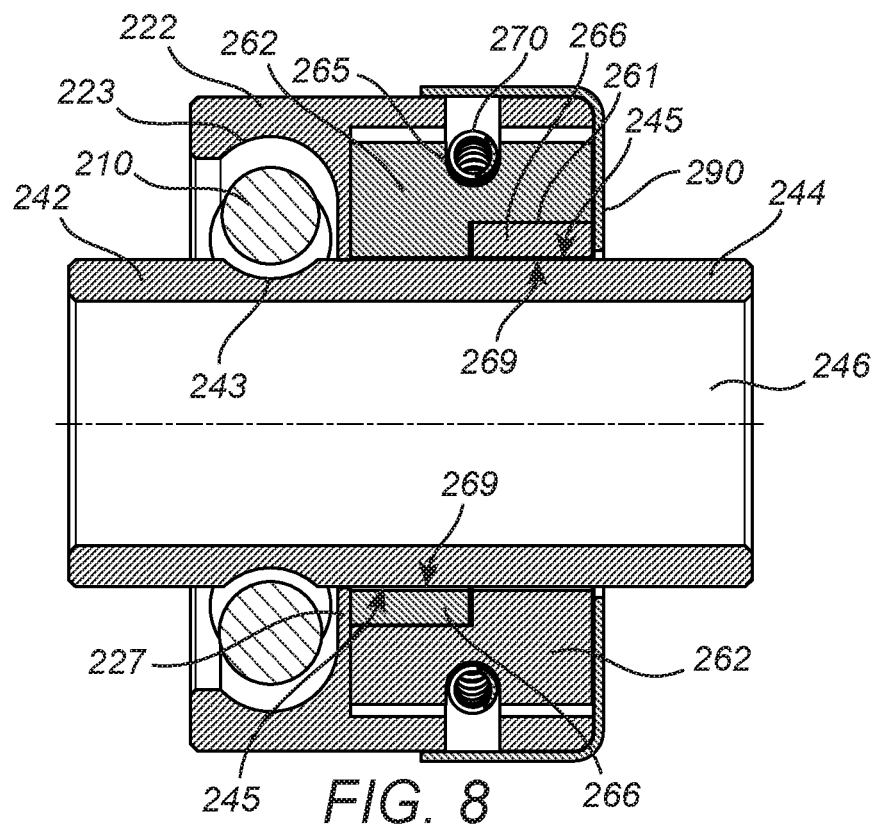
FIG. 8 is a cross-sectional view of the self-governing bearing of FIG. 5 taken along the line VIII-VIII of FIG. 7.
Figure 9:
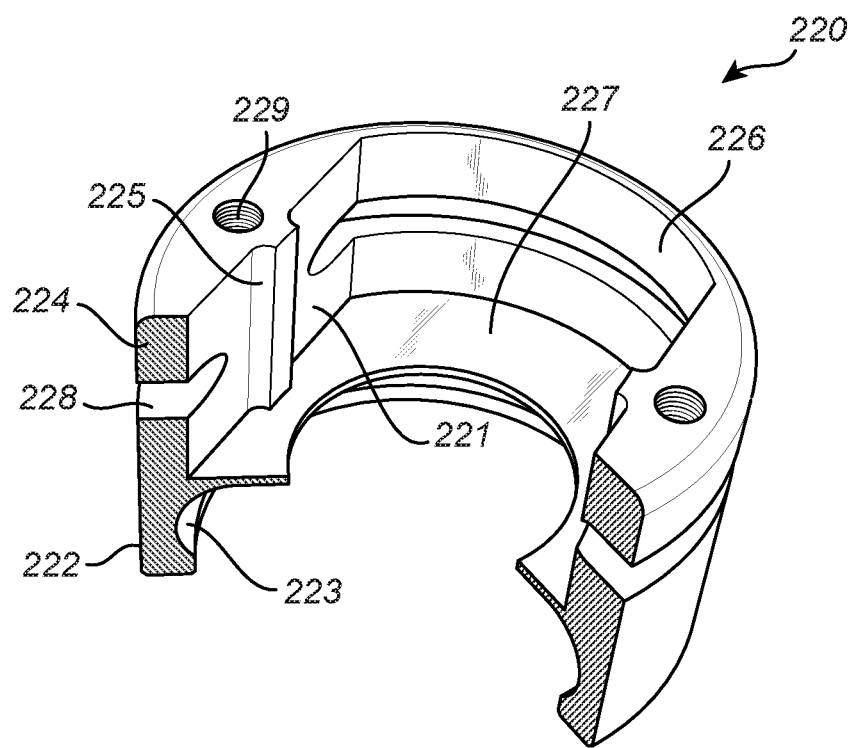
FIG. 9 is a perspective view of the outer ring of FIG. 5 with a portion cutaway.
Figure 10:
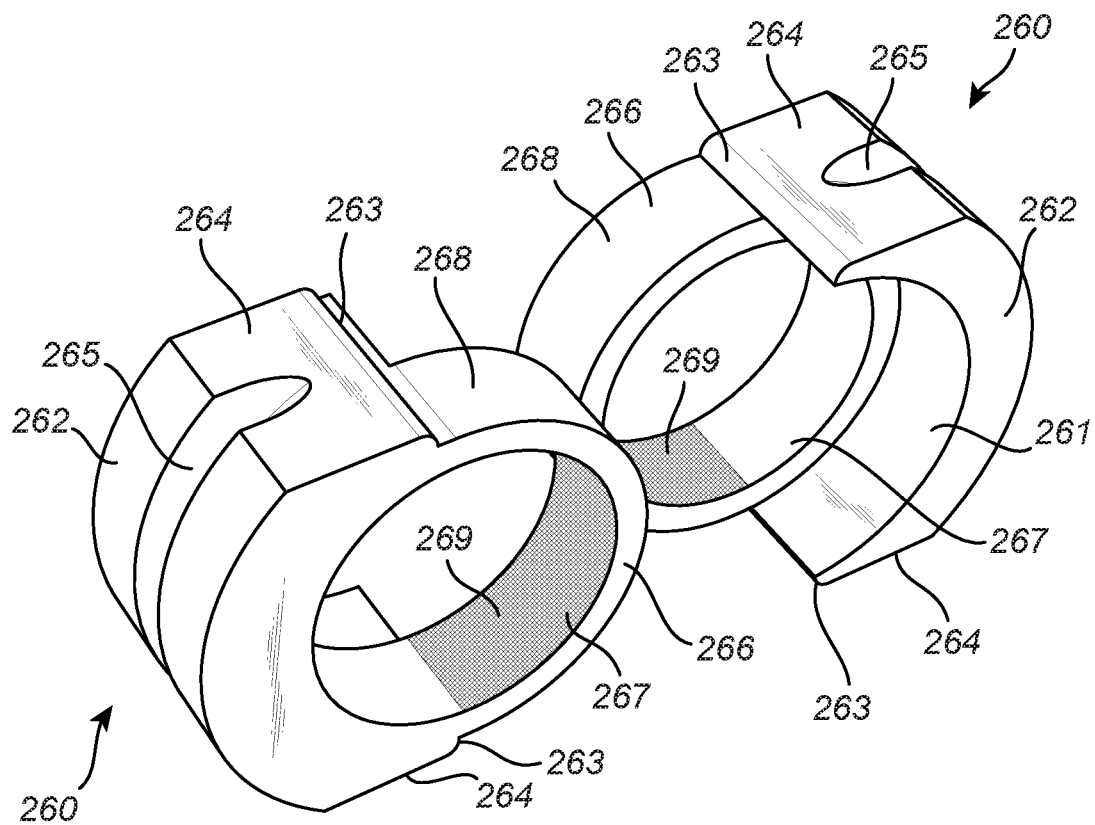
FIG. 10 is a perspective view of the brake pads of FIG. 5.

FIG. 5 is a perspective view of an exemplary embodiment of a self-governing bearing 200. FIG. 6 is an exploded perspective view of the self-governing bearing 200 of FIG. 5. FIG. 7 is a front perspective view of the self-governing bearing 200 of FIG. 5. FIG. 8 is a cross-sectional view of the self-governing bearing 200 of FIG. 5 taken along the line VIII-VIII of FIG. 7. FIG. 9 is a perspective view of the outer ring 220 of FIG. 5 with a portion cutaway. And FIG. 10 is a perspective view of the brake pads 260 of FIG. 5. Referring to FIGS. 5-10, the self-governing bearing 200 includes an inner ring 240, an outer rotor 230, and bearings 210.

In embodiments, the inner ring 240 includes an annular shape and includes an inner bearing portion 242, an inner race 243, an inner hub 244, a hub surface 245, and a shaft bore 246. The inner bearing portion 242 and the inner hub 244 are adjacent portions of the annular shape. The inner race 243 is positioned in the inner bearing portion 242 and is an annular outwardly facing groove adapted to receive the bearings 210.

In embodiments, the inner hub 244 generally includes a cylindrical shape, such as a hollow cylinder, with the hub surface 245 on an outer surface thereof. The hub surface 245 is a brake contacting surface that is an externally facing circumferential surface of the inner ring 240. In embodiments, the hub surface 245 is a right circular cylindrical surface. The shaft bore 246 extends through the inner ring 240 and is adapted to receive a shaft, such as a static, non-rotating, shaft. In some embodiments, the inner ring 240 includes radial holes 241 which are adapted to receive set screws 206 for securing the inner ring 240 to the shaft. Optionally, the inner ring 240 is fit to the shaft with one or more of an interference fit and keyed geometry.

In embodiments, the inner bearing portion 242 and the inner hub 244 are integrally formed as a unitary component forming the inner ring 240. In other embodiments, the inner bearing portion 242 and the inner hub 244 are joined together to form the inner ring 240, such as in instances where the surface property requirements for the hub surface 245 and for the inner race 243 are different.

In embodiments, the outer rotor 230 includes an outer ring 220, brake pads 260, and a circular spring 270. The outer ring 220 includes an outer brake housing portion 224 that is adapted to receive the brake pads 260. Referring to FIGS. 6, 8, and 9, in embodiments, the outer brake housing portion 224 includes a brake pad pocket 226, outer ring guide surfaces 221, a brake pad stops 225, an external annular slot 228, and axial holes 229. The brake pad pocket 226 is an internal space adapted to receive the brake pads 260.

The outer ring guide surfaces 221 are flat surfaces. In the embodiment illustrated the outer ring guide surfaces 221 are parallel to one another and are adapted to guide the brake pads 260. The parallel surfaces result in the brake pad pocket 226 having a horizontal cylinder shape with upper and lower portions removed therefrom, similar to that of a cylindrical segment, but with two planes cutting the horizontal cylinder rather than one. The brake pad stops 225 extend inward from the outer ring guide surfaces 221. In the embodiment illustrated, each brake pad stop 225 extends in the axial direction along a corresponding outer ring guide surface 221 and is centered in the outer ring guide surface 221. The brake pad stops 225 are adapted to position the brake pads 260 within the brake pad pocket 226.

The external annular slot 228 is an annular slot that extends around an exterior cylindrical surface of the outer ring 220. In the embodiment illustrated, the external annular slot 228 extends completely through the outer brake housing portion 224 to the internal cylindrical surfaces of the brake pad pocket 226 and partially into the outer brake housing portion 224 at the locations of the outer ring guide surfaces 221, such that the external annular slot 228 does not extend completely through the outer brake housing portion 224 along the outer ring guide surfaces except at the sides thereof (in some embodiments). The portions adjacent the outer ring guide surfaces 221 are adapted to hold the circular spring 270, at least partially, while the other portions are adapted to allow the circular spring 270 to pass therethrough to the brake pads 260.

The axial holes are adapted to receive axial set screws 206.

In embodiments, the outer ring 220 also includes an outer race portion 222. The outer race portion 222 includes an outer race 223. The outer race 223 is positioned on an internally facing surface of the outer race portion 222 and is adapted to receive the bearing elements 210 therein. In the embodiment illustrated, the outer race portion 222 and the outer brake housing portion 224 are integrally formed as a unitary component forming the outer ring 220. In other embodiments, the outer race portion 222 and the outer brake housing portion 224 are joined together to form the outer ring 220.

The brake pads 260 are positioned radially outward from the hub surface 245 and within the brake housing portion 224. Each of the brake pads 260 includes a pad retention slot 265. The pad retention slots 265 are adapted to receive the circular spring 270. In embodiments, the pad retention slots 265 form an annular ring with the portions of the external annular slot 228 adjacent to the outer ring guide surfaces 221 where the annular ring is adapted to receive the circular spring 270.

Referring to FIG. 10, each brake pad 260 includes a brake body 262 and a brake ring 266 adjoining the brake body 262. The brake ring 266 includes a bore 267 that is adapted to receive the inner ring 240. Each brake pad 260 also includes a brake surface 269 within the bore 267 opposite the brake body 262. The brake surface 269 is at least part of the internally facing cylindrical surface of the brake ring 266. In embodiments, the brake surface 269 is a removable insert 269, such as a ceramic insert, that provides the desired surface properties for braking when brought into contact with the hub surface 245.

A mass of the brake body 262 relative to the brake ring 266 is such that a center of mass of the brake pad 260 is toward the brake body 262 relative to a center of rotation of the outer rotor 230.

In embodiments, each brake pad 260 also includes pad guide surfaces 264 and pad retention surfaces 263. The pad guide surfaces 264 are adapted to be parallel to the outer ring guide surfaces 221. In the embodiment illustrated, the pad guide surfaces 264 are at opposite sides of the brake body 262 forming segments at each end of the cylindrical wedge shape of the brake body 262. The pad retention surfaces 263 are stepped surfaces that are adapted to contact a corresponding brake pad stop 225 to position the brake pads 260 relative to the outer brake housing portion 224 and to concentrically align the bore 267 with the inner ring 240.

In the embodiment illustrated, each brake pad 260 also includes a ring socket 261 that is positioned axially adjacent to the brake ring 266. The ring socket 261 is adapted to receive the brake ring 266 of another brake pad 260, such that multiple brake pads 260 are brought together with the ring sockets 261 receiving the brake rings 266 of the corresponding brake pad 260.

The circular spring 270 is positioned within the pad retention slot 265 of each of the brake pads 260. The circular spring 270 is adapted to hold the brake pads 260 in an annular offset position from the hub surface 245 while the outer rotor 230 rotates below a predetermined speed and to allow the brake pads 260 to contact the hub surface 245 while the outer rotor 230 rotates at or above the predetermined speed. In particular embodiments, each of the brake bodies 262 of the brake pads 260 shifts radially outward, due to the offset of the center of mass, and the brake surface 269 of each of the brake pads 260 shifts radially inward and into contact with the hub surface 245 while the outer rotor 230 rotates at or above the predetermined speed. As noted above with regards to the circular spring 170, the circular spring 270 is selectable from multiple circular springs 270, and the predetermined speed is determined based on one or more properties of the selected circular spring or springs 270. And in some embodiments, the circular springs 270 are color coded based on the one or more properties of each of the of circular springs 270.

In some embodiments, the outer rotor 230 further includes a housing cap 290 that is secured to an end of the outer ring 220. The housing cap 290 encloses the brake pad pocket 226 and in embodiments is adapted to axially secure the brake pads 260 within the brake pad pocket 226. The housing cap 290 is secured to the outer ring 220, such as by axial set screws 206 that thread into the axial holes 229 of the outer ring 220.

The bearings 210 include bearing elements 212 that are positioned radially between and within the outer race 223 and the inner race 243. In embodiments, the bearing elements 212 include one of balls (such as the embodiment illustrated), rollers, and tapered rollers. The use of other bearings, such as deep-groove bearings, pillow block bearings, thrust bearings, and the like are also contemplated.

While the embodiment illustrated in FIGS. 5-10 is that of a rolling element bearing, in some embodiments, other types of bearings are also used, such as magnetic bearings, fluid bearings, and the like. In these embodiments, the outer race and inner race are not necessary. Furthermore, the bearing elements include electro-magnets or fluid for supporting the outer rotor 230 relative to the inner ring 220.

In view of the above, the embodiments disclosed herein generally disclose a self-governing bearing assembly 100, 200 for governing a rotational speed of a rotor. The self-governing bearing assembly 100, 200 includes a stator 120, 240, a rotor 130, 230, and bearing elements 112, 212. The stator 120, 240 includes a first bearing portion 122, 242 and a braking portion 124, 244 axially offset from the first bearing portion 122, 242 and including a brake contacting surface 145, 245. The stator 120, 240, is one of an outer ring 120, 220 and an inner ring 140, 240 where the inner ring 140, 240 is positioned at least partially within the outer ring 120, 220. The rotor 130, 230 includes the other of the outer ring 220 and the inner ring 140, brake pads 160, 260, and a circular spring 170, 270. The other of the outer ring 220 and the inner ring 140 includes a second bearing portion 142, 222. The brake pads 160, 260 are positioned radially from the brake contacting surface 125, 245 and are adapted to rotate with the other of the outer ring 220 and the inner ring 140. Each of the brake pads 160, 260 includes a pad retention slot 165, 265. The circular spring 170, 270 is positioned within the pad retention slot 165, 265 of each of the brake pads 160, 260. The bearing elements 112, 212 are axially aligned with the first bearing portion 122, 242 and the second bearing portion 142, 222 and are adapted to rotationally support the rotor 130, 230 relative to the stator 120, 240.

Figure 11:
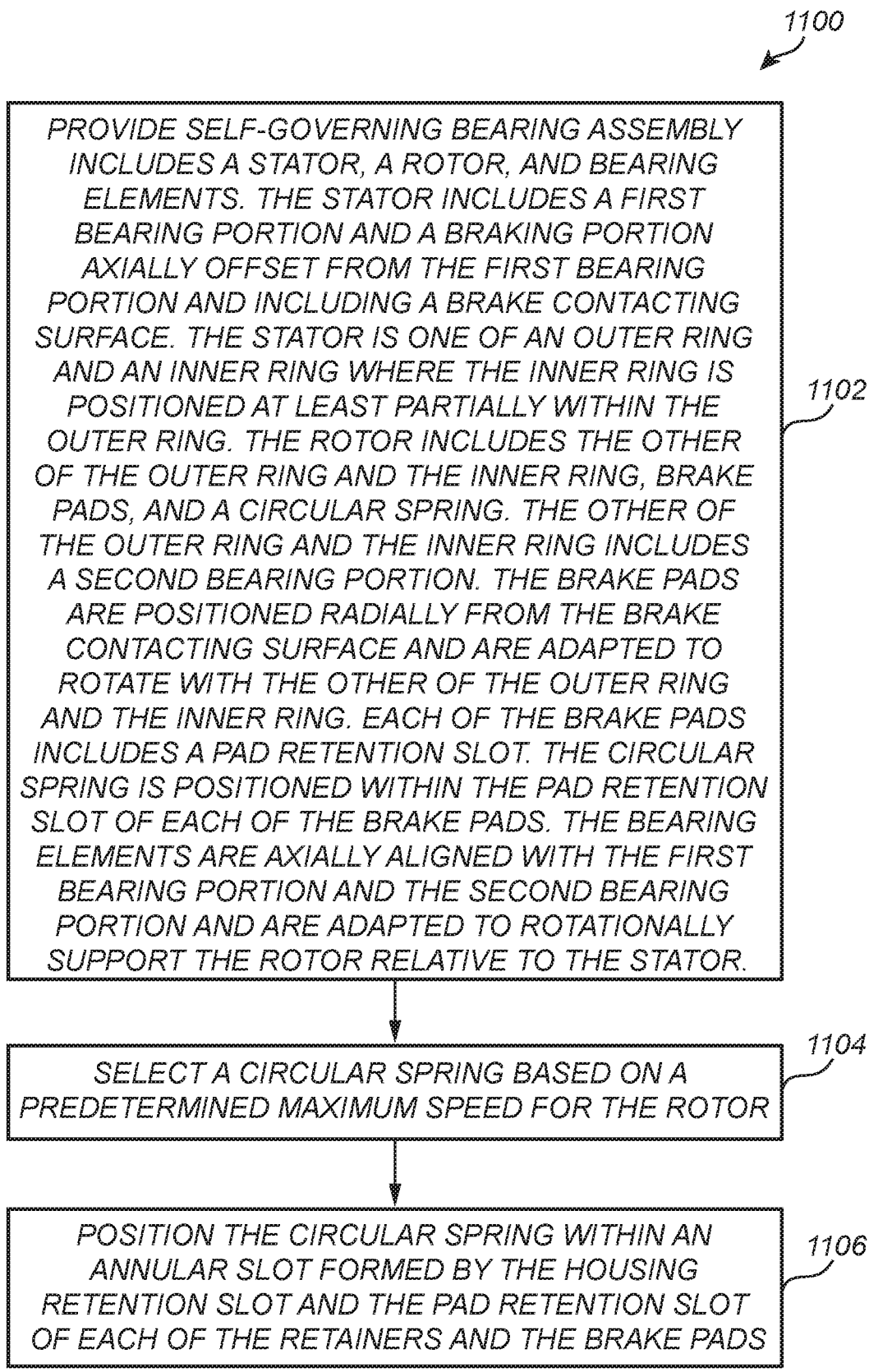
FIG. 11 is a flowchart of a method for governing a rotational speed of a rotor.

FIG. 11 is a flowchart of a method 1100 for governing a rotational speed of a rotor. The method 1100 includes providing self-governing bearing assembly 100, 200 includes a stator 120, 240, a rotor 130, 230, and bearing elements 112, 212. The stator 120, 240 includes a first bearing portion 122, 242 and a braking portion 124, 244 axially offset from the first bearing portion 122, 242 and including a brake contacting surface 145, 245. the stator 120, 240, is one of an outer ring 120 and an inner ring 240 where the inner ring 140, 240 is positioned at least partially within the outer ring 120, 220. The rotor 130, 230 includes the other of the outer ring 220 and the inner ring 140, brake pads 160, 260, and a circular spring 170, 270. The other of the outer ring 220 and the inner ring 140 includes a second bearing portion 142, 222. The brake pads 160, 260 are positioned radially from the brake contacting surface 125, 245 and are adapted to rotate with the other of the outer ring 220 and the inner ring 140. Each of the brake pads 160, 260 includes a pad retention slot 165, 265. The circular spring 170, 270 is positioned within the pad retention slot 165, 265 of each of the brake pads 160, 260. The bearing elements 112, 212 are axially aligned with the first bearing portion 122, 242 and the second bearing portion 142, 222 and are adapted to rotationally support the rotor 130, 230 relative to the stator 120, 240 at step 1102. In the various embodiments, any configuration of the self-limiting bearings assembly 100, 200 disclosed herein is provided.

The method 1100 also includes selecting a circular spring 170 based on a predetermined maximum speed for the rotor at step 1104. The method 1100 further includes positioning the circular spring 170 within an annular slot formed by the housing retention slot 155 and the pad retention slot 165 of each of the retainers 154 and the brake pads 160 at step 1106.

In some embodiments, the circular spring 170 is selectable from multiple circular springs 170, and the predetermined maximum speed of the rotor is determined based on one or more properties of the selected circular spring 170. In embodiments, the one or more properties includes one or more of a spring constant, a diameter, a material, and the like of the circular spring 170. In some embodiments, the circular springs 170 are color coded based on the one or more properties of each of the multiple circular springs 170. In these embodiments, the circular spring 170 is also selected from the multiple circular springs 170 based on the color thereof.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A self-governing bearing assembly, comprising:
   a stator comprising a first bearing portion and a braking portion axially offset from the first bearing portion and comprising a brake contacting surface, wherein the stator is one of an outer ring and an inner ring where the inner ring is positioned at least partially within the outer ring;
   a rotor comprising
      the other of the outer ring and the inner ring comprising a second bearing portion;
      brake pads positioned radially from the brake contacting surface and adapted to rotate with the other of the outer ring and the inner ring, each of the brake pads comprising a pad retention slot; and
      a circular spring positioned within the pad retention slot of each of the brake pads; and
   bearing elements axially aligned with the first bearing portion and the second bearing portion and adapted to rotationally support the rotor relative to the stator.

2. The self-governing bearing assembly of claim 1, wherein the circular spring is adapted to hold the brake pads in an annular offset position from the brake contacting surface while the rotor rotates below a predetermined speed and to allow the brake pads to contact the brake contacting surface while the rotor rotates at or above the predetermined speed.

3. The self-governing bearing assembly of claim 2, wherein the circular spring is selectable from a plurality of circular springs, and the predetermined speed is determined based on one or more properties of the selected circular spring.

4. The self-governing bearing assembly of claim 3, wherein the plurality of circular springs is color coded based on the one or more properties of each of the plurality of circular springs.

5. The self-governing bearing assembly of claim 1, wherein the circular spring is a garter spring.

6. The self-governing bearing assembly of claim 1, wherein the bearing elements comprise one of rolling elements, electro-magnets, and fluid for supporting the inner rotor relative to the outer ring.

7. The self-governing bearing assembly of claim 1, wherein the first bearing portion comprises a first race, the second bearing portion comprises a second race, and the bearing elements comprise one of balls, rollers, and tapered rollers positioned radially between and within the first race and the second race.

8. A self-governing bearing assembly, comprising:
an outer ring comprising a brake contacting surface that is an internally facing circumferential surface of the outer ring;
an inner rotor comprising
retainers circumferentially spaced apart and each comprising a housing retention slot;
brake pads positioned radially inward from the brake contacting surface, each of the brake pads being positioned circumferentially between adjacent retainers and comprising a pad retention slot; and
a circular spring positioned within an annular slot formed by the housing retention slot and the pad retention slot of each of the retainers and the brake pads; and
bearing elements adapted to rotationally support the inner rotor relative to the outer ring.

9. The self-governing bearing assembly of claim 8, wherein the circular spring is adapted to hold the brake pads in an annular offset position from the brake contacting surface while the inner rotor rotates below a predetermined speed and to allow the brake pads to contact the brake contacting surface while the inner rotor rotates at or above the predetermined speed.

10. The self-governing bearing assembly of claim 9, wherein the circular spring is selectable from a plurality of circular springs, and the predetermined speed is determined based on one or more properties of the selected circular spring.

11. The self-governing bearing assembly of claim 10, wherein the plurality of circular springs is color coded based on the one or more properties of each of the plurality of circular springs.

12. The self-governing bearing assembly of claim 8, wherein the circular spring is a garter spring.

13. The self-governing bearing assembly of claim 8, wherein the bearing elements comprise one of rolling elements, electro-magnets, and fluid for supporting the inner rotor relative to the outer ring.

14. The self-governing bearing assembly of claim 8, wherein each of the retainers and the brake pads comprises an annular sector shape that combine to form an annular shape.

15. A self-governing bearing assembly, comprising:
an inner ring comprising a brake contacting surface that is an externally facing circumferential surface of the inner ring;
an outer rotor comprising
an outer ring comprising an outer brake housing portion;
brake pads positioned radially outward from the brake contacting surface and within the brake housing portion, each of the brake pads comprising a pad retention slot; and
a circular spring positioned within the pad retention slot of each of the brake pads; and
bearing elements adapted to rotationally support the inner rotor relative to the outer ring.

16. The self-governing bearing assembly of claim 15, wherein the circular spring is adapted to hold the brake pads in an annular offset position from the brake contacting surface while the outer rotor rotates below a predetermined speed and to allow the brake pads to contact the brake contacting surface while the outer rotor rotates at or above the predetermined speed.

17. The self-governing bearing assembly of claim 16, wherein each brake pad comprises a brake body and a brake ring adjoining the brake body, the brake ring comprising a bore with the inner ring received therein and a brake surface within the bore opposite the brake body, and wherein a mass of the brake body relative to the brake ring is such that a center of mass of the brake pad is toward the brake body relative to a center of rotation of the outer rotor, such that the brake pad shifts radially outward and the brake surface shifts radially inward and into contact with the brake contacting surface while the outer rotor rotates at or above the predetermined speed.

18. The self-governing bearing assembly of claim 16, wherein the circular spring is selectable from a plurality of circular springs, and the predetermined speed is determined based on one or more properties of the selected circular spring.

19. The self-governing bearing assembly of claim 17, wherein the plurality of circular springs is color coded based on the one or more properties of each of the plurality of circular springs.

20. The self-governing bearing assembly of claim 15, wherein the bearing elements comprise one of rolling elements, electro-magnets, and fluid for supporting the inner rotor relative to the outer ring.

* * * * *